United States Patent
Payne et al.

(10) Patent No.: US 6,540,937 B1
(45) Date of Patent: Apr. 1, 2003

(54) ADSORBENT COMPOSITIONS

(75) Inventors: David S. Payne, West Seneca, NY (US); Thomas H. Powers, Mayville, NY (US)

(73) Assignee: Multisorb Technologies, Inc., Buffalo, NY (US)

(*) Notice: Subject to any disclaimer, the term of this patent is extended or adjusted under 35 U.S.C. 154(b) by 0 days.

(21) Appl. No.: 09/997,568

(22) Filed: Nov. 29, 2001

(51) Int. Cl.[7] .................... B01J 20/04; B01J 20/12; C09K 3/18
(52) U.S. Cl. ............... 252/194; 252/184; 252/190; 252/192; 423/210
(58) Field of Search .................. 252/194, 184, 252/189, 190, 191, 192, 193, 385; 423/210, 327.1, 331

(56) References Cited

U.S. PATENT DOCUMENTS

| | | | |
|---|---|---|---|
| 4,047,962 A | * 9/1977 | Copeland | ...... 106/90 |
| 4,332,845 A | 6/1982 | Nawata et al. | |
| 5,372,429 A | * 12/1994 | Beaver, Jr. et al. | ...... 383/109 |
| 5,743,942 A | 4/1998 | Shelley et al. | |
| 6,248,812 B1 | * 6/2001 | Symons | ...... 524/2 |
| 6,299,842 B1 | * 10/2001 | Kozak et al. | ...... 422/102 |

FOREIGN PATENT DOCUMENTS

| | | | |
|---|---|---|---|
| JP | 57-144021 | * | 9/1982 |
| JP | 58-20222 | * | 2/1983 |
| JP | 58-199020 | * | 11/1983 |
| JP | 58-219919 | * | 12/1983 |
| JP | 59-160518 | * | 9/1984 |
| JP | 62-117614 | * | 5/1987 |
| JP | 5-220327 | * | 8/1993 |

OTHER PUBLICATIONS

Derwent–Acc–No. 1993–308422.*
Derwent–Acc–No. 1984–003209.*
Derwent–Acc–No. 1982–86998E.*
Derwent–Acc–No. 1983–26335K.*
JP Abstract Pub–No.: JP62117614A, 1987.*
Derwent–Acc–No.: 1984–261038.*
JP Abstract Pub–No.: JP358219919A, 1983.*
Derwent–Acc–No.: 1973–06335U.*
In 1982 Multisorb Technologies, Inc. sold a permeable packet containing a palladium oxide oxygen absorber. The packet consisted of two sides. One side was spun–bonded polyester. The other side was a laminate pf polyethylene bonded to MYLAR. The outer edges of the spun–bonded polyester were heat–sealed to the outer edges of the polyethylene side of the laminate.

* cited by examiner

Primary Examiner—Joseph D. Anthony
(74) Attorney, Agent, or Firm—Joseph P. Gastel

(57) ABSTRACT

A water vapor adsorption and water retaining composition containing particulate calcium chloride and particulate vermiculite in a flexible container having a side of spun-bonded polyethylene heat sealed to a side of extrusion coated polyethylene on polyester. The foregoing composition can also contain clay.

12 Claims, 2 Drawing Sheets

ADSORBENT COMPOSITIONS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to improved water vapor adsorption and water retaining compositions.

By way of background, there are situations wherein products must be protected from moisture in environments wherein there are wide swings in temperature and relative humidity.

BRIEF SUMMARY OF THE INVENTION

It is one object of the present invention to provide improved water vapor adsorption and water retaining compositions which will operate well under conditions of wide swings in temperature and relative humidity.

Another object of the present invention is to provide improved water vapor adsorption and water retaining compositions which will adsorb water vapor and will retain the adsorbed water without appreciably increasing the volume of the composition.

A further object of the present invention is to provide improved water vapor adsorption and water retaining compositions containing water retaining material which will hold a high multiple of its weight of water.

Another object of the present invention is to provide an improved container for a water vapor adsorbing and water retaining composition. Other objects and attendant advantages of the present invention will readily be perceived hereafter.

The present invention relates to a water vapor adsorption and water retaining composition comprising particulate calcium chloride and particulate vermiculite.

The present invention also relates to a water vapor adsorbing and water retaining composition comprising calcium chloride, vermiculite and clay.

The present invention also relates to a flexible container comprising a side of spun-bonded polyethylene and a side of extrusion coated polyethylene on polyester.

The present invention also relates to a water vapor adsorption and water retaining composition comprising particulate calcium chloride and particulate vermiculite in a flexible container having a side of spun-bonded polyethylene and a side of extrusion coated polyethylene on polyester.

The present invention also relates to a water vapor absorbing and water retaining composition comprising particulate calcium chloride, vermiculite and clay in a flexible container comprising a side of spun-bonded polyethylene and a side of extrusion coated polyethylene on polyester.

DETAILED DESCRIPTION OF THE INVENTION

One embodiment of the improved water vapor adsorption and water retaining composition of the present invention comprises particulate calcium chloride C and particulate vermiculite V. The calcium chloride is a deliquescent which has a high affinity for water vapor and therefore works well under conditions of wide swings in temperature and relative humidity. The calcium chloride and particulate vermiculite have the capacity of absorbing and retaining approximately two and one-half times its weight of water without expanding appreciably.

Figure 5:
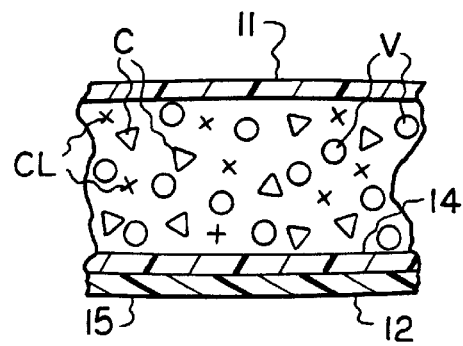
FIG. 5 is a view similar to FIG. 4 but showing the container of FIG. 1 containing the composition of calcium chloride, vermiculite and clay of the present invention.
Figure 4:
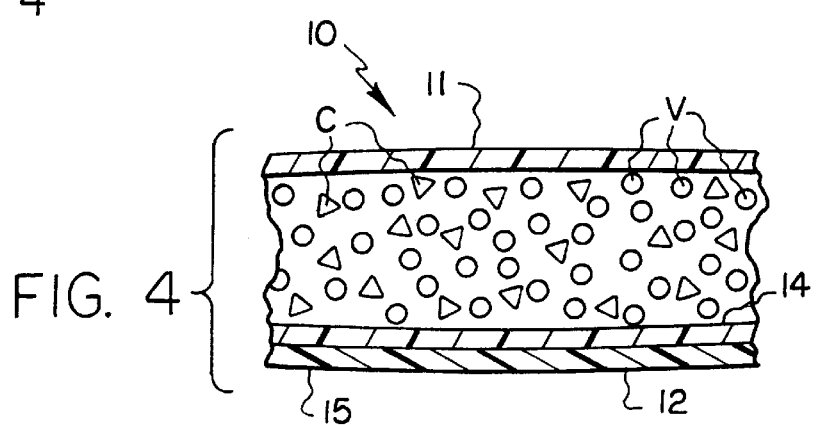
FIG. 4 is a fragmentary enlarged cross sectional view taken substantially along line 3—3 of FIG. 2.

Another embodiment of the present invention (FIG. 5) comprises calcium chloride C, vermiculite V and clay CL. The combination of calcium chloride, vermiculite and clay has the capacity of absorbing and retaining approximately 1.8 times its weight of water.

In the calcium chloride and vermiculite composition, the calcium chloride may be present in an amount by weight of between about 5% and 90% and more preferably between about 12% and 50% and most preferably between about 20% and 35%.

The particulate calcium chloride is preferably of a mix having particles of between about 0.6 mm and 4.7 mm. However, the size is not critical inasmuch as the calcium chloride deliquesces into a syrupy solution and therefore any reasonable size is acceptable.

In the calcium chloride and vermiculite composition, the vermiculite may be present in an amount by weight of between about 25% and 95% amd more preferably between about 45% and 85% and most preferably between about 55% and 75%.

The particulate vermiculite may be of a size of between about 0.05 mm and 5 mm and more preferably between about 0.15 mm and 3 mm and most preferably between about 0.3 mm and 2.8 mm.

The composition of calcium chloride and vermiculite is produced by mixing the foregoing components in the desired relatively sufficient proportions.

In the calcium chloride, vermiculite and clay composition, the calcium chloride may be present in an amount by weight of between about 10% and 30% and more preferably between about 15% and 25% and most preferably between about 15% and 20%.

In the calcium chloride, vermiculite and clay composition, the vermiculite may be present in an amount by weight of between about 5% and 80% and more preferably between about 40% and 75% and most preferably between about 60% and 70%.

In the calcium chloride, vermiculite and clay composition, the clay may be present in an amount by weight of between about 5% and 75% and more preferably between about 10% and 50% and most preferably between about 15% and 20%.

The preferred clay is a bentonite type of clay. However, any suitable clay including but not limited to attapulgite and montmorillonite clay may be used.

The clay may be of a particle size of between about 0.5 inch and 200 mesh and more preferably between about 0.25 inch and 50 mesh and most preferably between about 4 mesh and 40 mesh.

In the calcium chloride, vermiculite and clay composition, the vermiculite and calcium chloride may be of the sizes discussed above relative to the calcium chloride and vermiculite composition.

The composition of calcium chloride, vermiculite and clay is produced by mixing the foregoing components in the desired relatively sufficient proportions.

As can be seen from a comparison of the amount of calcium chloride in the calcium chloride and vermiculite composition with an amount of the calcium chloride in the calcium chloride, vermiculite and clay composition, the latter is a much smaller percentage of the total weight of the composition. This makes the latter more suitable for use in environments where the corrosive tendency of the calcium chloride should be minimized. Yet, the smaller amount of calcium chloride still provides an excellent amount of water absorption.

The illustrated flexible container 10 is fabricated of two sides of flexible sheet material and is approximately 10 inches long, 7 inches wide and about 1 ½ inches thick at its midpoint when it is filled with each of the above compositions. The dimensions include a ½ inch heat-sealed border on all four sides. The container has a side 11 of spun-bonded polyethylene having a thickness of 6.5 mils known under the registered trademark TYVEK which is a product of E. I. DuPont de Nemours & Co. and has a designation 1059B. The other side 12 is an extrusion coated composite having an extrusion coating 14 of 0.0020 inches of polyethylene on a base 15 of 0.00048 inches of polyester. This is a commercially obtainable product from Rollprint Packaging Products, Inc., and it has a designation of RP0025. The polyethylene 11 is sealed to the polyethylene 14. The container 10 having an extrusion coated composite 12 is advantageous over prior flexible containers having a side which is an adhesive-bonded laminate because the adhesive has been eliminated and therefore need not be taken into consideration relative to the possibility of melting which could lead to delamination or otherwise degrading during a heat-sealing operation.

Figure 1:
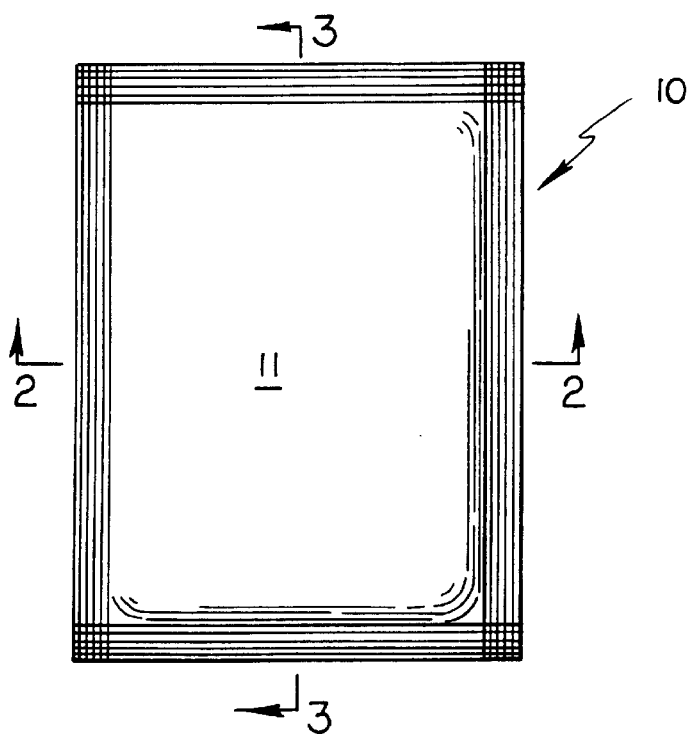
FIG. 1 is a plan view of a container containing the improved water vapor adsorption and water retaining composition of calcium chloride and vermiculite of the present invention.
Figure 3:
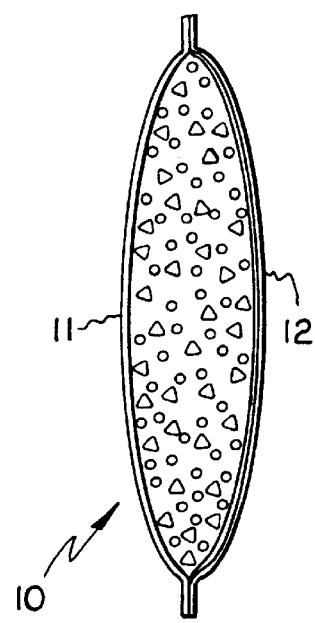
FIG. 3 is a cross sectional view taken substantially along line 3—3 of FIG. 1.
Figure 2:
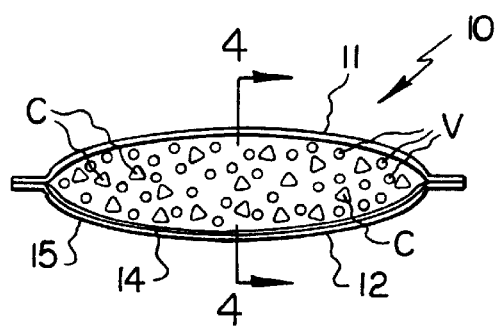
FIG. 2 is a cross sectional view taken substantially along line 2—2 of FIG. 1.

In a preferred embodiment of the calcium chloride and vermiculite composition, the container 10 of FIG. 1 contains 50 grams of calcium chloride and 120 grams of vermiculite. The volume of calcium chloride is approximately 50.8 cc and the volume of the vermiculite is approximately 900 cc. The 120 grams of vermiculite will absorb approximately 480 grams of liquid water which it receives in the form of a calcium chloride solution. In the preferred embodiment, the calcium chloride is present by weight in an amount of 29.4% and the vermiculite is present by weight in an amount of 70.6%. The vermiculite is of a mix having a size range of between about 0.6 mm and 2.4 mm. The calcium chloride, as noted above, is of a mix having a size range of between about 0.6 mm to 4.7 mm.

In a preferred embodiment of the calcium chloride, vermiculite and clay composition, the container 10 of FIG. 1 contains 35 grams of calcium chloride and 115 grams of vermiculite and 35 grams of bentonite type clay. The volume of calcium chloride is approximately 40 cc and the volume of the vermiculite is approximately 815 cc and the volume of the clay is approximately 40 cc. The 150 grams of vermiculite and clay will absorb and retain approximately 276 grams of liquid water which it receives in the form of a calcium chloride solution. In the preferred embodiment, the calcium chloride is present by weight in an amount of 19% and the vermiculite is present by weight in an amount of 62% and the clay is present by weight in an amount of 19%. The vermiculite is of a mix having a size range of between about 0.6 mm and 2.4 mm. The calcium chloride, as noted above, is of a mix having a size range of between about 0.6 mm to 4.7 mm and the clay is a mix having a size range of between about 4 mesh and 40 mesh.

The vermiculite is, as is well known, a combination of silicon dioxide, aluminum oxide, magnesium oxide, calcium oxide, potassium oxide, iron oxide, titanium oxide and water. It is an accordion-shaped granule having a bulk density of between 4 and 10 pounds per cubic foot and, insofar as pertinent here, has a water-holding capacity of 220%–325% by weight and 20%–50% by volume. It is also known as a hydrated laminar magnesium-aluminum-iron silicate.

Figure 6:
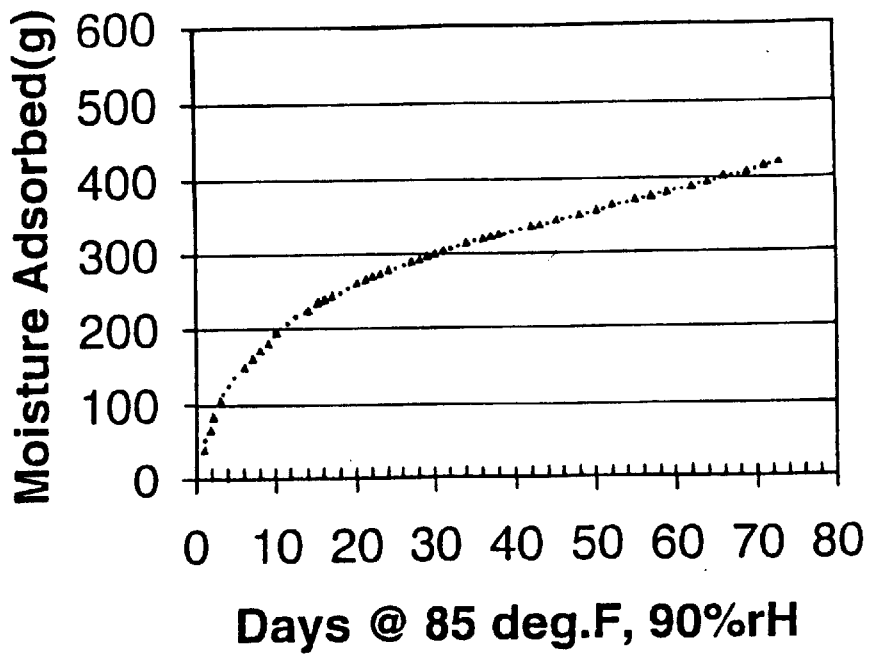
FIG. 6 is a graph of a composition of calcium chloride and vermiculite functioning under the conditions stated thereon.

The characteristics of the above described composition having 50 grams of calcium chloride and 120 grams of vermiculite is shown in the graph of FIG. 6 which plots moisture adsorbed in grams against days at 85° F. and 90% relative humidity. It can be seen from the graph of FIG. 6 that the sample having a combined weight of 170 grams (50 grams of calcium chloride and 120 grams of vermiculite) will continuously adsorb and retain liquid water for over 70 days, and the amount at the end of about 75 days is approximately 415 grams of water, and the curve is still rising.

Figure 7:
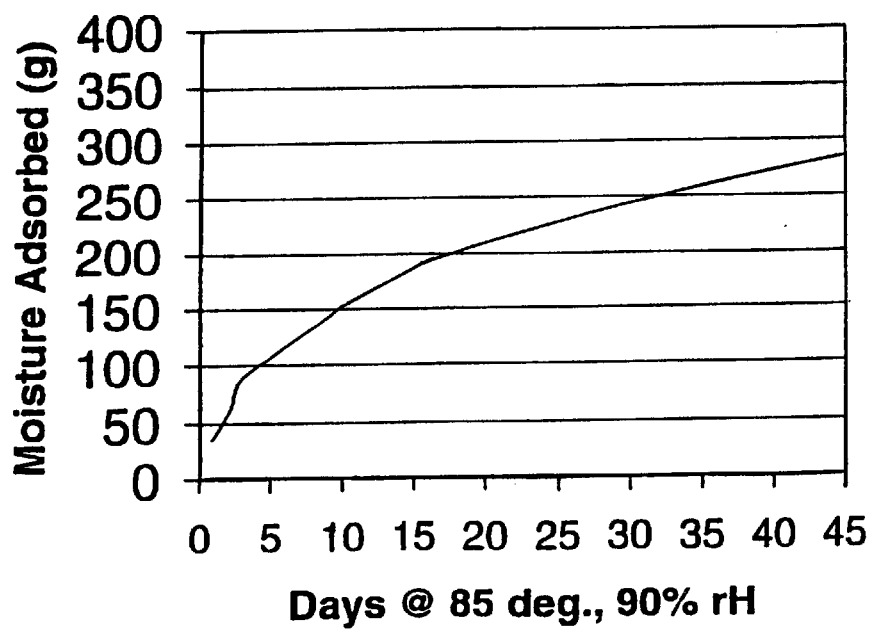
FIG. 7 is a graph of a composition of calcium chloride, vermiculite and clay functioning under the conditions stated thereon.

The characteristics of the above described composition having 35 grams of calcium chloride, 115 grams of vermiculite and 35 grams of clay is shown in the graph of FIG. 7 which plots moisture adsorbed in grams against days at 85° F. and 90% relative humidity. It can be seen from the graph of FIG. 7 that the sample having a combined weight of 185 grams (35 grams of calcium chloride, 115 grams of vermiculite and 35 grams of clay) will continuously adsorb and retain 276 grams of liquid water over a 45-day period, and the amount at the end of 45 days is approximately 276 grams of water, and the curve is still rising. While not shown in the graph, at the end of 80 days, 333 grams of water were absorbed and retained.

While the above description has referred to a composition as consisting essentially of calcium chloride and vermiculite and another composition consisting essentially of calcium chloride, vermiculite and clay, it will be appreciated that other minor components may be added for specific purposes which do not appreciably alter the basic water-vapor adsorption and water retaining characteristics of the above-described compositions.

While preferred embodiments of the present invention have been disclosed, it is to be understood that it is not limited thereto but may be otherwise embodied within the scope of the following claims.

What is claimed is:

1. A water vapor absorption and water retaining composition comprising particulate calcium chloride present by weight in an amount of between about 15% and 25%, particulate vermiculite present by weight in an amount of between about 40% and 75% and clay present by weight in an amount of between about 10% and 50%.

2. A composition as set forth in claim 1 wherein said calcium chloride is of a size of between about 0.6 mm and 4.7 mm and wherein said vermiculite is of a size of between about 0.05 mm and 5 mm and wherein said clay is of a size of between about 0.5 inch and 200 mesh.

3. A composition as set forth in claim 1 wherein said vermiculite is of a size of between about 0.15 mm and 3 mm, and said clay is of a size of between about 0.25 inch and 40 mesh.

4. A composition as set forth in claim 1 wherein said calcium chloride is present by weight in an amount of about 19%, and said vermiculite in an amount of about 62%, and said clay in an amount of about 19%.

5. A composition as set forth in claim 1 wherein said calcium chloride is present by weight in an amount of between about 15% and 20%, and said vermiculite is present in an amount of between about 60% and 70% and said clay is present in an amount of between about 15% and 20%.

6. A composition as set forth in claim 5 wherein said calcium chloride is of a size of between about 0.6 mm and 4.7 mm and wherein said vermiculite is of a size of between about 0.3 mm and 2.8 mm and wherein said clay is of a size of between about 4 mesh and 20 mesh.

7. A water vapor absorption and water retaining composition consisting essentially of particulate calcium chloride present by weight in an amount of between about 15% and 25%, particulate vermiculite present by weight in an amount of between about 40% and 75% and clay present by weight in an amount of between about 10% and 50%.

8. A composition as set forth in claim 7 wherein said calcium chloride is of a size of between about 0.6 mm and 4.7 mm and wherein said vermiculite is of a size of between about 0.05 mm and 5 mm and wherein said clay is of a size of between about 0.5 inch and 200 mesh.

9. A composition as set forth in claim 7 wherein said vermiculite is of a size of between about 0.15 mm and 3 mm, and said clay is of a size of between about 0.25 inch and 40 mesh.

10. A composition as set forth in claim 7 wherein said calcium chloride is present by weight in an amount of about 19%, and said vermiculite in an amount of about 62%, and said clay in an amount of about 19%.

11. A composition as set forth in claim 7 wherein said calcium chloride is present by weight in an amount of between about 15% and 20%, and said vermiculite is present in an amount of between about 60% and 70% and said clay is present in an amount of between about 15% and 20%.

12. A composition as set forth in claim 11 wherein said calcium chloride is of a size of between about 0.6 mm and 4.7 mm and wherein said vermiculite is of a size of between about 0.3 mm and 2.8 mm and wherein said clay is of a size of between about 4 mesh and 20 mesh.

\* \* \* \* \*